Patented Oct. 8, 1929

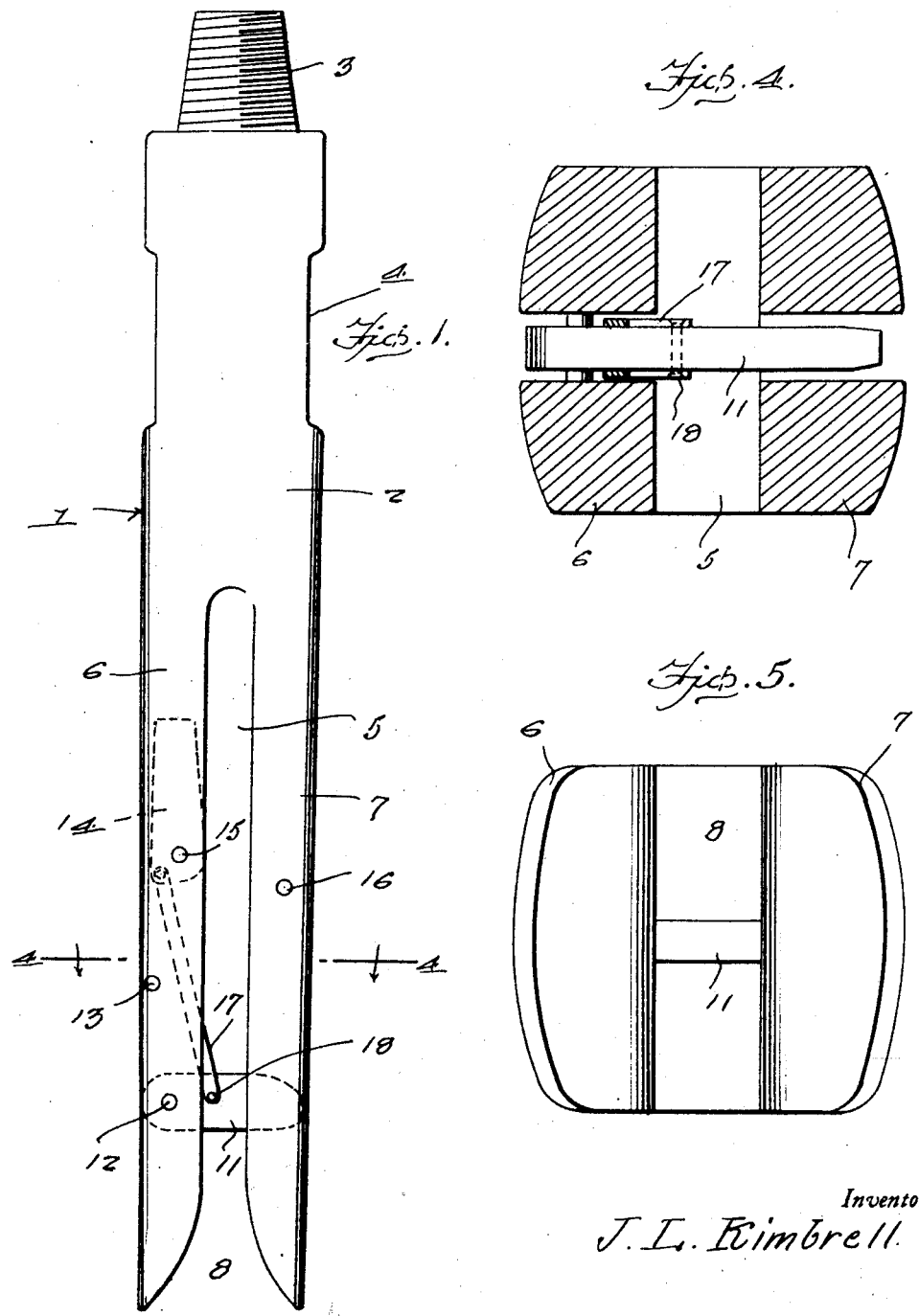

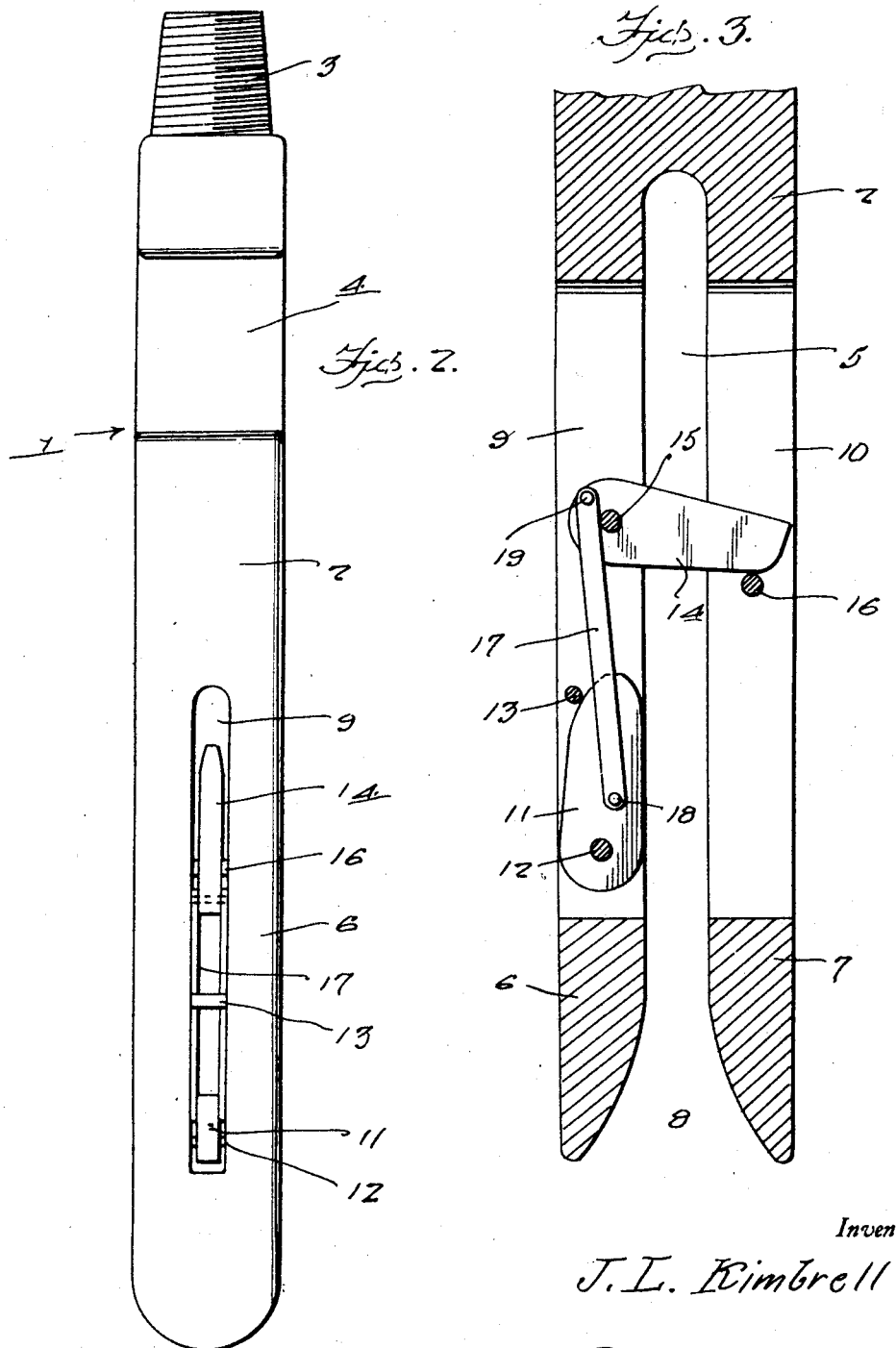

1,731,070

UNITED STATES PATENT OFFICE

JUNE L. KIMBRELL, OF SASAKWA, OKLAHOMA

FISHING TOOL

Application filed July 3, 1928. Serial No. 290,089.

The present invention relates to improvements in fishing tools and has for its principal object to provide a device which is particularly adapted for withdrawing a bailer or slush bucket from an oil well.

One of the important objects of the present invention is to provide a fishing tool which includes a means for automatically moving the bail suspension bar in an operative position when the pivoted latch associated with the tool is moved in an upward direction.

A further object is to provide a fishing tool of the above mentioned character which will, at all times, be positive and efficient in its operation, the same being further of such construction as to operate efficiently under all conditions, so that the same will not clog up with mud or other substances or obstructions that might be in the well.

A further object is to provide a fishing tool of the above mentioned character which is simple in construction, inexpensive, strong and durable, and further well adapted to the purpose for which it is designed.

Other objects of the invention will become apparent as the nature of the invention proceeds and when taken in connection with the accompanying drawings.

In the accompanying drawings, forming a part of this application and in which like reference characters designate like parts throughout the several views:

Figure 1 is a side elevation of the fishing tool embodying my invention, showing the bail suspenison bar in a lowered operative position, the latch being shown in a raised inoperative position.

Figure 2 is a view looking at right angles with respect to Figure 1.

Figure 3 is an enlarged sectional view through the parallel spaced leg members showing the position of the pivoted bar and the latch when the tool is about to be inserted downwardly into the well.

Figure 4 is a transverse section taken approximately on the line 4—4 of Figure 1, looking in the direction of the arrows, and Figure 5 is a bottom plan view of the tool, showing the flared entrance or mouth between the legs.

In the drawings, wherein for the purpose of illustration is shown the prefered embodiment of my invention, the numeral 1 designates generally my improved fishing tool, the same comprising a cylindrical body 2 that is formed at its upper end with the externally threaded tapered neck 3, for detachable engagement with a lower end of a drill rod. The portion of the body below the threaded neck is formed with the opposed flattened tool engaging faces 4, as clearly indicated in Figure 1.

The cylindrical body 2 is formed with a longitudinally extending slot 5 that extends upwardly from the lower end of the body to the intermediate portion thereof whereby to form a pair of parallel spaced leg members 6 and 7 respectively, and the inner opposed faces of these leg members at their lower free ends are curved outwardly to provide a flared entrance passage 8, as also suggested very clearly in Figure 1, as well as in Figure 3. These leg members are formed with longitudinally extending communicating through slots 9 and 10 respectively for a purpose to be presently described. A vertically swinging bar 11 is pivotally supported adjacent its lower end on a transverse pin 12, in the lower end of the slot 9 formed in the leg 6 and the outward swinging movement of this bar is limited by means of the stop pin 13, as shown in Figure 3. The bar 11 is of such width as to be disposed entirely within the confines of the slot 9, when said bar is disposed in a vertical inoperative position.

A latch member 14 is pivotally supported at its lower end in the slot 9 at a point above the bar 11, the pivotal support for the latch member being illustrated at 15. This latch member is also of such width as to be disposed within the confines of the slot 9 when the latch member is in an inoperative position as shown in Figure 1.

For the purpose of limiting the downward swinging movement of the latch member 14, there is provided the transverse stop pin 16, in the slot 10 of the opposed leg 7.

For the purpose of operatively connecting the pivoted bar 11 with the pivoted latch member 14, there is provided the pair of connecting links 17 that are disposed on opposite sides of the bar and latch member. The lower ends of these links are pivotally connected to the intermediate portion of the bar 11 as at 18, while the upper ends of the links are pivotally connected to the latch member 14, at a point below and slightly off center the pivotal connection 15 as at 19.

The use of my improved fishing tool may be briefly stated as follows:

Normally the parts are arranged as shown in Figure 3, whereupon the bar 11 will be disposed in a raised inoperative position, while the latch member 14 will extend across the slot 5, and when the tool is lowered into the well in the usual manner, the bail of the bucket will enter the slot 5, through the flared entrance 8, and upon striking the latch member 14, a further downward movement of the tool will result in the latch member 14 being forced upwardly on its pivot 15 and simultaneously the links 17 will swing the bar 11 downwardly and inwardly to the position shown in Figure 1, whereby the bail of the bucket will be locked within the slot 5 and will be caused to rest upon the horizontally disposed bar 11, which acts as a suspension means for the bucket and when the tool is lifted upwardly out of the well, it will carry with it the bucket or bailer.

The provision of the slots in the body 2 will prevent the movable parts of the device from being clogged up with mud and being rendered inoperative.

It will thus be seen from the foregoing description that I have provided a fishing tool which will, at all times, be positive and efficient in its operation and due to its simplicity, the same may be manufactured at a very low cost, and will be strong and durable.

While I have shown the preferred embodiment of my invention, it is to be understood that various changes in the size, shape and arrangement of parts may be resorted to, without departing from the spirit of the invention or the scope of the appended claims.

Having thus described my invention, what I claim as new is:

1. In a fishing tool of the class described, a body, spaced legs formed thereon, the inner opposed faces of the free ends of the legs being designed to provide a flared entrance for the bail of a bucket, a bail suspension means pivotally associated with one of the legs, a pivoted latch carried by one of said legs, said bail suspension means being disposed in an operative position when the latch is in an operative position, and means for operatively connecting the suspension means with the latch to effect the movement of the suspension means to an operative position when the latch is moved to an inoperative position by the bail passing upwardly between the spaced legs.

2. In a fishing tool of the class described, a cylindrical body formed with a longitudinal slot that extends upwardly from the lower end thereof providing a pair of spaced legs, the inner opposed faces of the lower free ends of the legs being designed to provide a flared entrance, said legs being formed with longitudinally extending communicating slots, a bucket bail suspension bar pivoted at its lower end in the lower end portion of the slot in one leg, a latch member pivoted at its lower end in the same slot at a point above the pivoted suspension bar, and links operatively connecting the bar with the latch whereby the same are adapted for simultaneous movement, said bar being disposed in a raised inoperative position when the latch is disposed in a lowered operative position across the communicating slot, the latch being moved upwardly to an inoperative position, and the bar being lowered to an operative position by the bail having engagement with the latch during the downward movement of the tool.

3. In a fishing tool of the class described, a cylindrical body formed with a longitudinal slot that extends upwardly from the lower end thereof providing a pair of spaced legs, the inner opposed faces of the lower free ends of the legs being designed to provide a flared entrance, said legs being formed with longitudinally extending communicating slots, a bucket bail suspension bar pivoted at its lower end in the lower end portion of the slot in one leg, a latch member pivoted at its lower end in the same slot at a point above the pivoted suspension bar, and links operatively connecting the bar with the latch whereby the same are adapted for simultaneous movement, said bar being disposed in a raised inoperative position when the latch is disposed in a lowered operative position across the communicating slot, the latch being moved upwardly to an inoperative position, and the bar being lowered to an operative position by the bail having engagement with the latch during the downward movement of the tool, and stop forming pins for limiting the swinging movement of the suspension bar and latch respectively in one direction.

In testimony whereof I affix my signature.

JUNE L. KIMBRELL.